United States Patent [19]

Owen et al.

[11] Patent Number: 4,650,620

[45] Date of Patent: Mar. 17, 1987

[54] FILAMENT WINDING OF ARTICLES OF COMPLEX SHAPE

[75] Inventors: Michael J. Owen; Victor Middleton, both of Nottingham; Kevin L. Edwards, Derby, all of United Kingdom

[73] Assignee: Ford Motor Company, Dearborn, Mich.

[21] Appl. No.: 704,836

[22] Filed: Feb. 25, 1985

[30] Foreign Application Priority Data

Feb. 25, 1984 [GB] United Kingdom ............... 8404957
Feb. 25, 1984 [GB] United Kingdom ............... 8404956

[51] Int. Cl.$^4$ .................. C08J 9/34; B29C 45/14; B29C 67/14; B29C 67/18
[52] U.S. Cl. ......................... 264/45.5; 264/46.4; 264/46.7; 264/46.9; 264/137; 264/257; 264/DIG. 83
[58] Field of Search .............. 264/257, 137, 46.7, 264/46.4, 46.9, 45.5, DIG. 83

[56] References Cited

U.S. PATENT DOCUMENTS 3,551,237 12/1970 Cox et al. ................ 264/137 X
3,617,593 11/1971 Alderfer ................. 264/257 X
3,843,759 10/1974 Keeham ................. 264/137 X
4,002,715 1/1977 Usui ...................... 264/257 X
4,090,002 5/1978 Rosenblum ............. 264/257 X
4,256,680 3/1981 Usui ...................... 264/257 X

FOREIGN PATENT DOCUMENTS 012167 6/1980 European Pat. Off. .

Primary Examiner—Philip Anderson
Attorney, Agent, or Firm—Peter D. McDermott; Roger L. May

[57] ABSTRACT

In a filament winding technique, filaments are wound around a mandrel, and the mandrel remains in the structure and becomes part, normally a structural part, of the article. The mandrel may be any suitable rigid, lightweight material, but a foamed material such as a structural foam is thought to be most suitable. Metal inserts for attaching other components to the filament wound article can be moulded into the mandrel surface, and locked in place by the filament windings. According to a preferred aspect of the invention a motor vehicle suspension wishbone is made according to such filament winding method and the mandrel on which the filaments are wound remains in the structure.

16 Claims, 12 Drawing Figures

FILAMENT WINDING OF ARTICLES OF COMPLEX SHAPE

INTRODUCTION

The present invention is directed to a method of filament winding structural articles and to articles, manufactured by such method, particularly, for example, a motor vehicle suspension wishbone.

BACKGROUND OF THE INVENTION

Filament winding is an established technique for producing essentially hollow, light-weight articles or components with a stiff, rigid skin. Components made by this technique are generally those which have a constant cross-section, such as pipes. Filaments, strands or tows impregnated or coated with thermosetting resin are wound tightly around a mandrel or former, and allowed to cure or set to form a hard skin. The technique has the ability to produce components of low weight and high rigidity. In order to achieve the desired low mass and low inertia in the finished article, the mandrel is removed after the resin has set, to leave the article in its final, hollow condition.

A problem with the production of complex shapes by filament winding techniques is that of removing the mandrel. It is possible to make the mandrel from a low melting point allow, and then to melt the alloy so that it flows out. Disadvantages of this method are the consequent weight of the mandrel which then has considerable inertia resulting in difficulties in accelerating and decelerating the mandrel during the winding process, and the heat energy and labour involved in melting the alloy and in reforming it for subsequent cycle. Such alloys also deteriorate over a number of cycles.

A variety of other mandrel constructions and removal methods are also known.

SUMMARY OF THE INVENTION

According to the invention, there is provided a method of manufacturing an article using a filament winding technique with the filaments being would onto a mandrel, characterised in that the mandrel remains part of the article after winding has been completed.

According to another aspect of the invention, there is provided a vehicle suspension wishbone made by such filament winding technique. Vehicle suspension wishbones serve to form a connection between a road wheel and the bodywork of a vehicle. A spring and shock absorber are conventionally attached between the vehicle body and the wishbone to isolate the bodywork from imperfections on the road surface. Suspension wishbones are thus highly stressed components. They are conventionally made of steel and are heavy. Since they form part of the unsprung mass of the vehicle, it is very desirable that their weight by reduced. The shape of the wishbone, as compared with a conventional metal wishbone, may be modified to facilitate winding by making the limb which supports the wheel bearing as a closed section with a longitudinal passage through the limb to accommodate the driveshaft. A wishbone made using these techniques can be at least 50% lighter than its metal equivalent. The shape may also be improved, because the lateral flanges which appear on a metal wishbone and where two pressed steel halves are connected together, will be omitted.

The use of a permanent mandrel can avoid the difficulties and disadvantages discussed above regarding removal of the mandrel. Additionally, mandrel removal costs are eliminated. Furthermore, with a suitable choice of mandrel material, the mandrel itself can contribute to the strength of the article and this in turn can mean that less filaments are required.

Filament winding allows placing and alignment of the filaments where they are needed to give the resulting structure the required strength. Because filaments are only put where they are needed, in the quantities needed, a component of minimum weight consistent with the strength requirements can be produced. In many cases it is also possible to produce a component of complex shape as a unitary structure, whereas the same component produced e.g. by metal stamping would require a number of component parts to be formed and then welded together.

The mandrel is preferably formed of a rigid, foamed plastics material such as a structural foam. The term "structural foam" refers to a body with a low density cellular core which has a solid integral skin. Many different materials can be used. Examples of suitable foams are polypropylene, polyethylene and polyurethane. Thermosetting foams are preferred to thermoplastic foams, particularly for larger sections because of the quicker setting or curing times.

Desirable properties for the mandrel are low cost, rigidity, light weight and a surface that is resistant to attack.

Low cost is necessary, as the cost of the mandrel material will have to be included in the cost of the finished article.

Rigidity is required for a number of reasons. Firstly, the mandrel must be capable of being handled before it is wound with filaments. Secondly, the mandrel must be able to withstand forces imposed on it during winding and forces imposed as a result of shrinkage of the filament wound structure during curing. These forces include compressive forces exerted by the filament tension, and also complex bending stresses imposed when winding a part of the article which is cantilevered from the mandrel support axis. Thirdly, since the mandrel remains as part of the article, it is advantageous if it can contribute to the strength of the article, mainly in resisting buckling of the otherwise hollow filament structure. Fourthly, if the mandrel rigidity and/or strength is sufficient, it may be possible to leave unstressed areas of the article unwound, with the mandrel itself providing the necessary strength in these areas and thus reducing cost and weight.

Light weight is required, as an important advantage of filament winding as a construction technique is its ability fo produce a light-weight component. Since the mandrel remains in place, its weight has to be added to that of the filament structure in calculating the component weight.

Resistance to chemical attack is required because the mandrel must not be attacked by the resin used to wet the filaments wound onto it, save to the extent necessary to produce a bond between the resin and the mandrel. Furthermore, if lightly stressed areas of the article are to be left unwound, the mandrel material must have a sufficiently tough surface to avoid deterioration arising from external attack.

It is also desirable for the mandrel to have some degree of temperature resistance, at least sufficient to withstand temperatures which may exist during the winding process.

The mandrel may be reinforced, for example by adding reinforcing fibres into the mandrel material prior to foaming.

The mandrel can be formed by injection moulding, normally by reaction injection moulding (RIM) and metal inserts which are to form a constituent part of the article can be moulded in to the mandrel skin. Each insert may have a tapered peg attached to it, and the pegs can then be held in the material of the mandrel. The necessary windings can then be applied over the mandrel and over or around the insert. Metal fittings, such as brackets to be attached to the article surface, can be bolted onto threaded studs. These studs can be mounted on baseplates with tapered edges which are moulded into the mandrel skin. The filament windings will pass over the baseplate and around the studs, so that the studs will be held in the article surface. When the filament winding has been completed, the stud will then project from the finished component to receive a threaded fastener.

The mandrel can be made in a metal mould. When moulding a thermoplastic material such as polyethylene form, two moulds can be used, to make the mandrel in two halves. The foam sections can thus be thin so that they cool in a reasonable time, and the halves can be secured together after moulding to make a hollow mandrel.

The invention extends to an article made by a filament winding technique as set out above.

BRIEF DESCRIPTION OF THE DRAWINGS

The invention will now be further described, by way of example, with reference to the accompanying drawings, in which.

DESCRIPTION OF PREFERRED EMBODIMENTS

Figure 1:
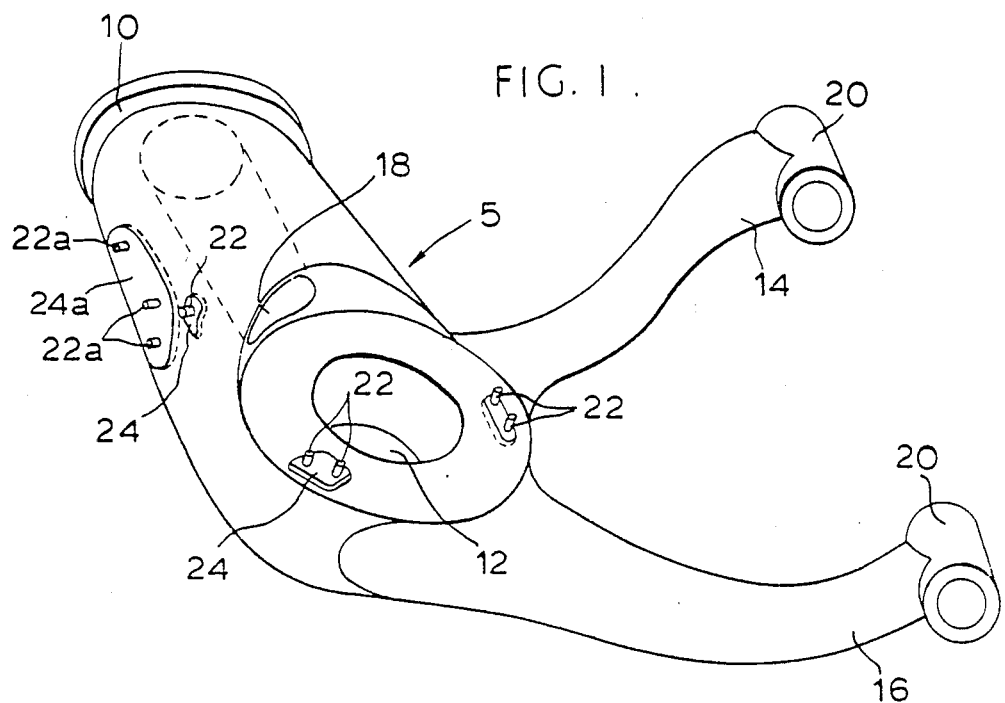
FIG. 1 shows a structural foam mandrel in the form of a motor vehicle suspension wishbone, to be wound with filaments.

The mandrel 5 shown in FIG. 1 is in a shape suitable for forming a suspension wishbone for a Ford Sierra car, and has a bearing flange 10, a spring well 12 and two wishbone arms 14 and 16. The limb extending from the spring well to the bearing flange has a passage 18 through it, for a drive shaft. The wishbone arms have pivot bushes 20 at their free ends. The flange 10 and the pivot bushes 20 are steel components anchored to the mandrel.

In use of the finished wishbone, the pivot bushes 20 will be pivoted on a sub frame of the vehicle. A spring 11 will have its lower end received in the spring well 12 (see FIG. 2). A road wheel bearing will be attached to the bearing flange 10, and a drive shaft for the road wheel will pass through the passage 18. A shock absorber will have its lower end attached to the wishbone through a bracket which will be attached to a set of studs 22a on a stud plate 24a.

Studs 22 on other stud plates 24 are provided for receiving other wishbone fittings.

The mandrel is made by a moulding process. The process used will depend on the mandrel material. For a polyurethane foam mandrel, a reaction injection moulding process can be used. The mould can be made in two halves, with a side mould piece. For experimental purposes, the mould can be made from glass reinforced plastics. For production purposes, a metal mould would be used. Foam will be injected through a nozzle situated in the upper mould half. This upper mould half also forms the spring well and contains a removable core plug. This core plug forms the passage 18. The plug is supported at one end by the bearing flange and at the other end by the upper mould half.

As well as forming the cavity for the mandrel, the mould will also locate the inserts, i.e. the bearing flange 10, the pivot bushes 20 and the stud plates 24. The stud plates are held temporarily to the inside surface of the mould cavity by a weak adhesive prior to foaming.

After cure, the mould can be disassembled to reveal the mandrel illustrated in FIG. 1.

Alternatively, a polyethylene foam mandrel can be produced. In this case, two moulds are used. Each mould will produce one half of a two part hollow shell mandrel. The two cured halves will then be snap fitted together to form a completed mandrel.

Because of the higher moulding pressures needed for polyethylene as compared with polyurethane, the mould will have to be made from aluminum or steel and firmly clamped in an injection or transfer moulding machine.

A metal dish 25 will be fitted at the bottom of the well 12 to provide a set for the spring 11 and to prevent abrasion of the fibres by the spring.

Figure 7:
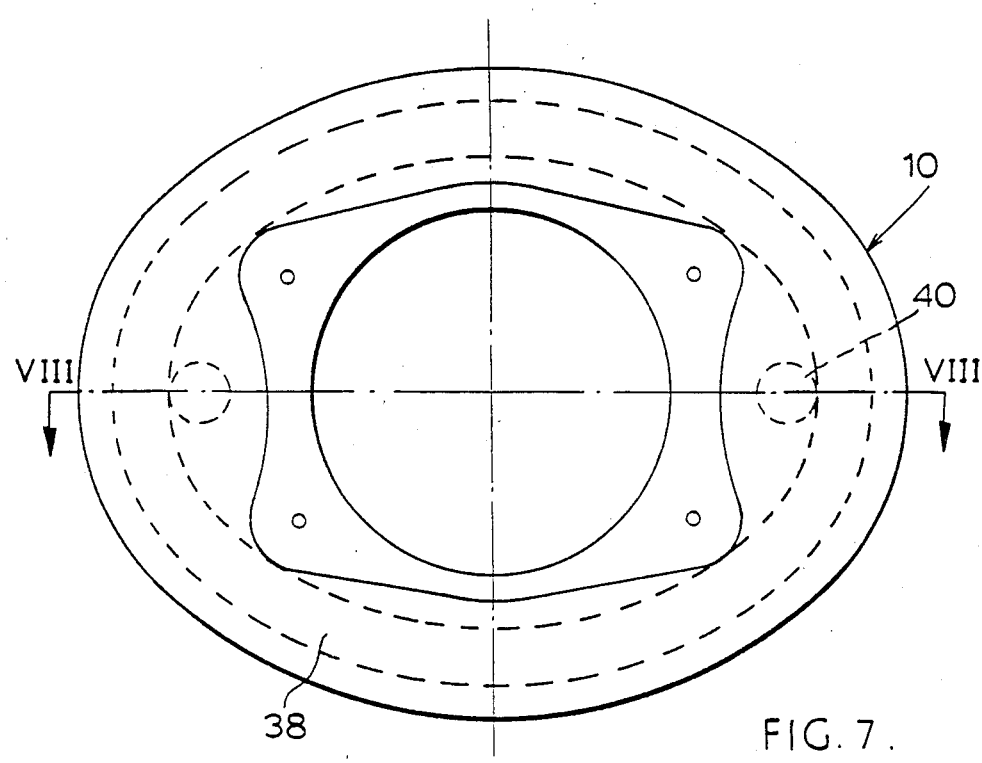
FIG. 7 is an end view of the wishbone flange where the wheel bearing will be fitted.
Figure 8:
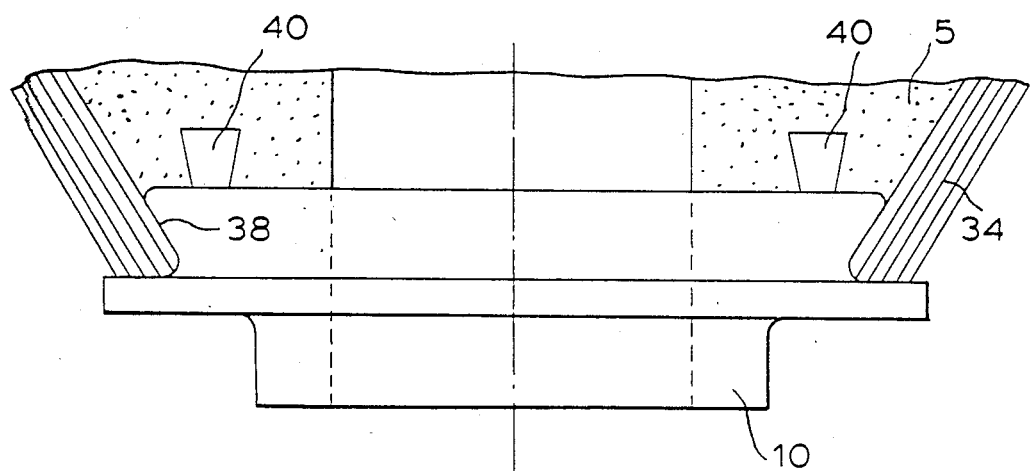
FIG. 8 is a section on the line VIII—VIII from FIG. 7.

FIGS. 7 and 8 show the bearing flange 10 which has a tapered collar 38 at the rear. Tapered pegs 40 project from this collar and anchor the metal flange 10 in the foam mandrel 5. The filament wound skin 34 which is wound onto the mandrel covers the tapered collar 38 and, together with the pegs 40, holds the flange 10 in place.

Figure 9:
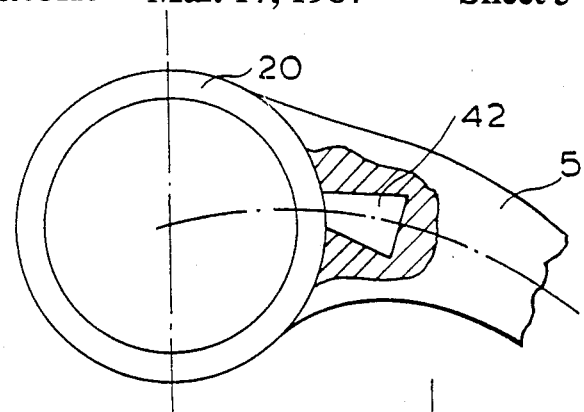
FIGS. 9 and 10 are plan and elevation views, both partly in section, of the end of a wishbone arm.
Figure 10:
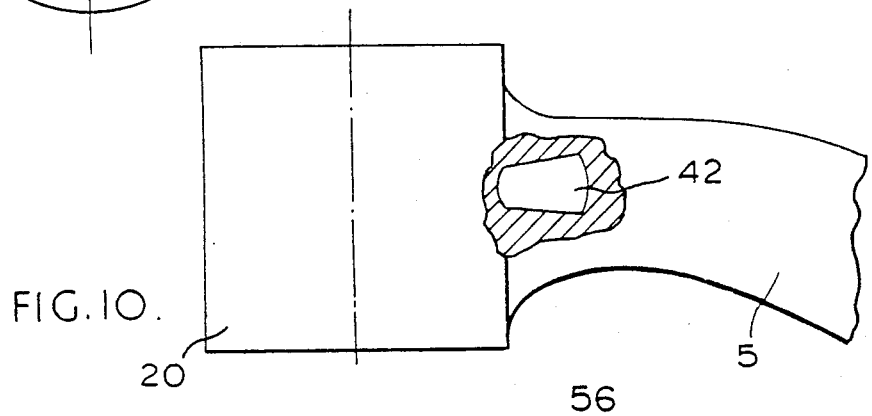

FIGS. 9 and 10 show the pivot bushes 20 and the mandrel 5 in the absence of any filament wound skin. Each bush 20 is formed with an integral peg 42 which is moulded in to the mandrel. These pegs serve to hold the bushes and the mandrel together before and during winding.

To form the filament wound surface of the component, filaments 27 such as glass fibres are wound around the mandrel 5. The fibres are coated or impregnated with a resin, which may be polyester or epoxy or vinyl ester resin, before application to the mandrel. Once the necessary number of windings have been applied, the structure is allowed to cure whereupon the resin sets and locks the strong filaments in place to produce an extremely strong component. This filament winding technology is well established.

It is necessary to apply the windings in a manner such that they do not slip over the mandrel surface after application. This is of particular importance when applying the process to large scale production of filament wound components, and reproduction of filament wound components, and reproducibility of winding patterns is then extremely important. To avoid any possibility of slippage, the filaments must be applied along geodesic or near geodesic paths on the mandrel surface. A geodesic path is the shortest distance between two points on a surface. For a complex shape, these paths are difficult to determine, but if the complex shape is approximated with regular shapes, the task is simplified. Geodesic paths are relatively easy to determine on a regular shape such as a cylinder or a cone.

Figure 5:
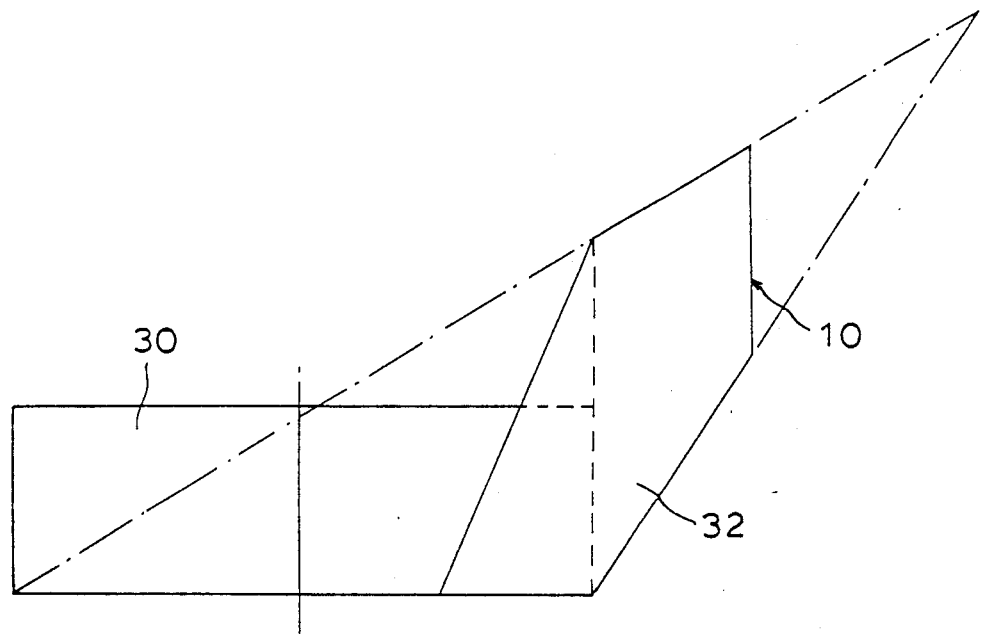
FIGS. 5 and 6 are respectively elevation and plan views of a simplified representation of part of the wishbone.
Figure 6:
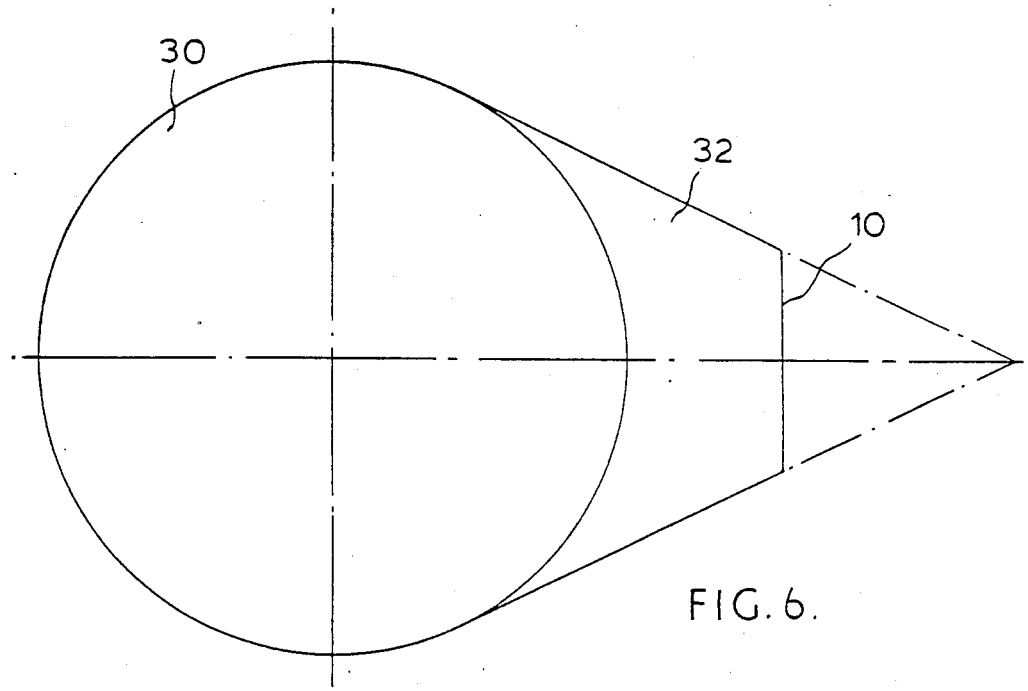

In the present case, the wishbone structure can be considered to consist of a cylindrical portion 30 (see FIGS. 5 and 6) forming the spring well and an oblique truncated conical portion 32 forming the limb supporting the bearing flange 10. The wishbone arms (which are not shown in FIGS. 5 and 6) can be considered as cylindrical shapes. These shapes interpenetrate each other as shown. The geodesic lines on these shapes, which each have a single axis of rotational symmetry, are easy to determine.

Figure 2:
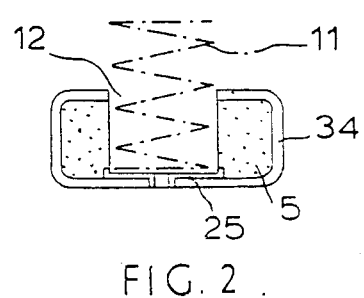
FIG. 2 is a section through a vehicle suspension wishbone, taken on the line II—II from FIG. 3.
Figure 3:
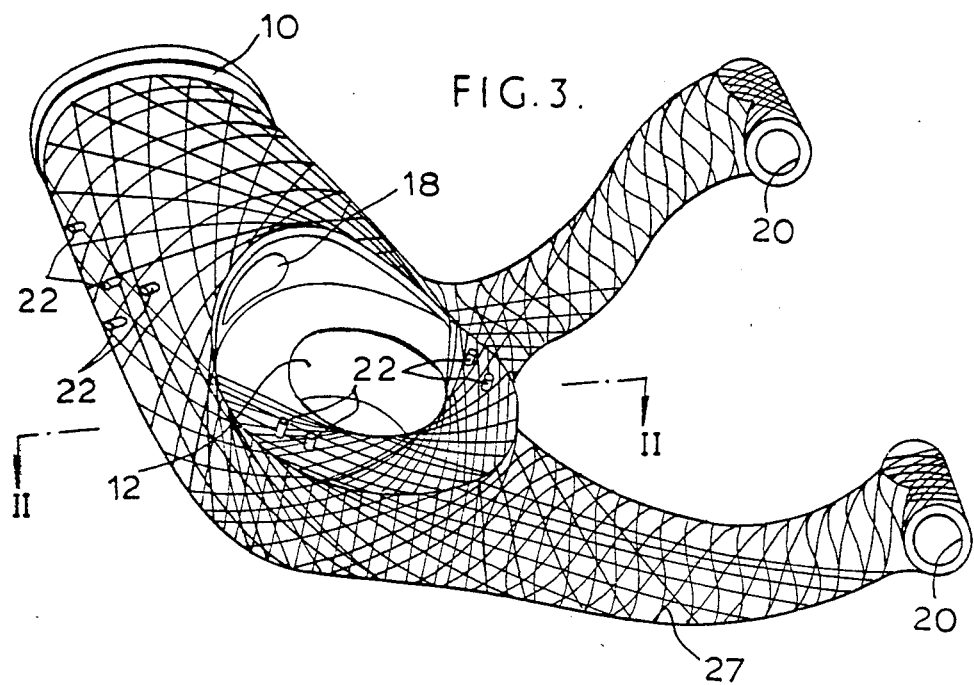
FIG. 3 shows the wishbone formed by winding on the mandrel of FIG. 1.

Winding of the structure takes place to produce the wishbone shown in FIG. 3. A cross section through this wishbone will appear as shown in FIG. 2, with the mandrel 5 covered by a wound layer 34.

Winding will be performed along some or all of helical, longitudinal and circumferential geodesic paths. Longitudinal windings give bending stiffness and helical windings give both bending and torsional stiffness. Circumferential windings improve coverage and diametral stiffness.

The oblique cone 32 is wound with helical and longitudinal windings. The cylindrical portion 30 is wound with a combination of helical, longitudinal and circumferential windings, especially longitudinal windings to resist the force induced by the coil suspension spring 11. The arms 14 and 16 are wound with both circumferential and helical windings. Longitudinal windings may also be needed. The pivot bushes 20 provide a natural turn-round for filament paths.

To permit access for the drive-shaft and coil spring, an unwound portion exists around the spring well 12. This is a naturally wound opening (i.e. the filaments are continuous around the opening) as opposed to a cut opening which could seriously weaken the structure.

Once complete coverage is obtained, it is then possible to repeat the coverage or to reinforce the structure locally in highly stressed areas with extra filaments.

Figure 11:
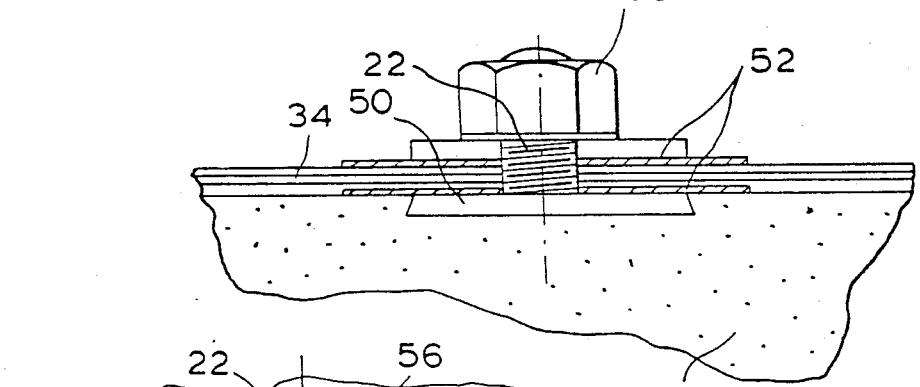
FIGS. 11 and 12 show a method of fixing an insert into a filament wound structure, FIG. 11 being a section taken on the line XI—XI of FIG. 12.
Figure 12:
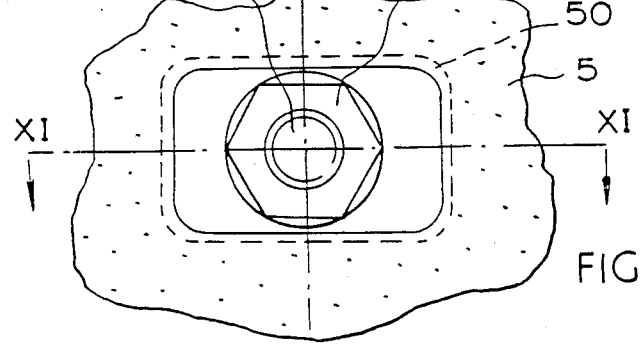

A typical stud plate 24 is shown in FIGS. 11 and 12. The plate has a base 50 with a bevelled perimeter. A stud 22 is upstanding from this base. In the mould, this base and stud are lightly affixed to the mould wall, so that the base 50 projects into the mould cavity. When foaming takes place, the foam flows around the tapered base and thus locks the base into the foam structure. When the mould is opened, the bond between the base and stud and the mould wall is broken and the stud plate remains fixed in the relativley high density material which forms the external skin of the mandrel.

The filament wound skin 34 is then applied to the mandrel, over the base 50 and around the root of the stud 22. If necessary, additional reinforcing patches 52 may be included in the filament wound structure.

Figure 4:
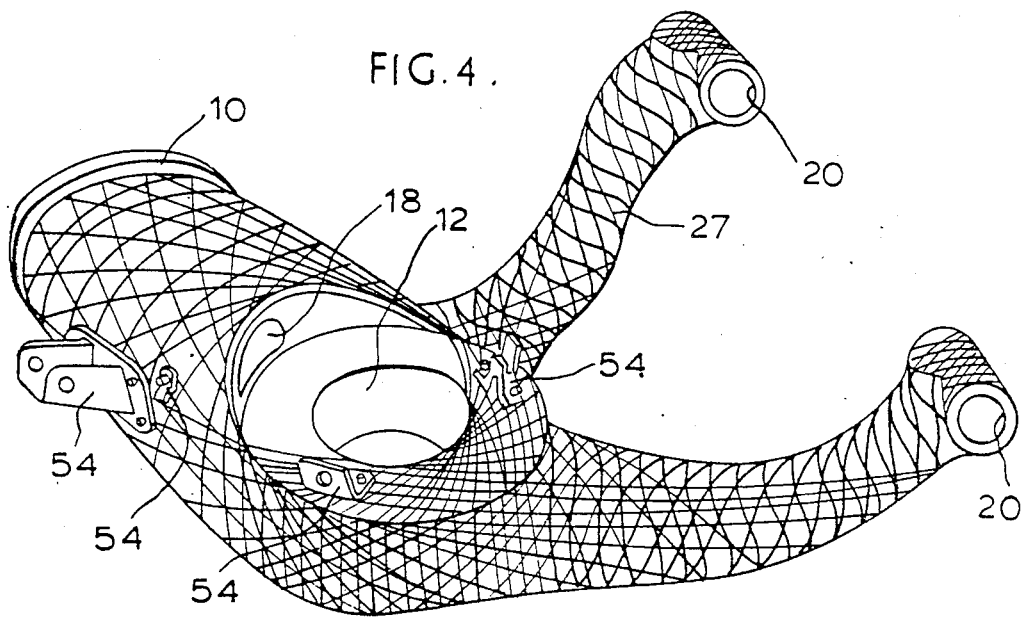
FIG. 4 shows the wishbone of FIG. 3, with additional components attached.

Once the filament wound structure 34 has cured, any required fitting 54 can be bolted on using a nut 56 on the projecting threaded stud 22. Examples of fitted brackets 54 are shown in place in FIG. 4.

The mandrel 5 remains as part of the wishbone, and contributes to its strength.

We claim:
1. A method of manufacturing an article using a filament winding technique where the article includes fittings by which it can be detachably connected to other components, wherein a mandrel is formed on which filaments can be wound, mounting plates attached to the fittings are embedded in the mandrel skin with the fittings projecting, and filaments are wound onto the mandrel and over the mounting plates to secure the fittings in place, with the mandrel remaining part of the article after winding has been completed.

2. A method as claimed in claim 1, wherein the mandrel is made as a rigid foamed structure.

3. A method as claimed in claim 1, wherein the mandrel is formed as a structural foam.

4. A method as claimed in claim 2, wherein the foam is a thermosetting foam.

5. A method as claimed in claim 2, wherein the foam is a thermoplastic foam.

6. A method as claimed in claim 4, wherein the foam is a polyurethane foam.

7. A method as claimed in claim 5, wherein the foam is a polyethylene foam.

8. A method as claimed in claim 5, wherein the foam is a polypropylene foam.

9. A method as claimed in claim 1, wherein the mandrel is formed by reaction injection moulding.

10. A method as claimed in claim 9, wherein the mountin plates are metal and are moulded in to the mandrel skin.

11. A method as claimed in claim 10, wherein each mounting plate has a tapered portion, and the tapered portions are embedded in the material of the mandrel.

12. A method as claimed in claim 4, wherein the mould for the mandrel is made in two halves, plus a side mould piece.

13. A method as claimed in claim 6, wherein the mould for the mandrel is made in two halves, plus a side mould piece.

14. A method as claimed in claim 5, wherein two moulds are used to make the mandrel in two halves which are secured together after moulding to make a hollow shell.

15. A method as claimed in claim 1, wherein the filaments are wound on geodesic or near-geodesic paths on the mandrel surface.

16. A method as claimed in claim 15, wherein the mandrel shape is approximated by a series of regular shapes, and geodesic paths are determined on these regular shapes.

* * * * *